United States Patent Office 3,438,891
Patented Apr. 15, 1969

3,438,891
PROCESS FOR DEMINERALIZING POLAR LIQUIDS AND FOR REGENERATING ION EXCHANGE RESINS
Kenneth A. Schmidt, Chicago Ridge, and Karsten Odland, La Grange Park, Ill., assignors to Nalco Chemical Company, Chicago, Ill., a corporation of Delaware
No Drawing. Filed Mar. 15, 1965, Ser. No. 439,959
Int. Cl. C02b *1/76;* B01d *15/06*
U.S. Cl. 210—32                                    10 Claims

ABSTRACT OF THE DISCLOSURE

A process for regenerating a multibed ion exchange system, said system including a weak acid cation exchange resin, a strong acid cation exchange resin, and an anion exchange resin in the polyvalent salt form. In the process bed void water from the anion exchanger is passed through the spent anion exchange bed. The effluent from the bed, which is weakly acidic, is passed through the weak acid cation exchange resin. The acid from the effluent is picked up by the weak acid resin. The effluent from the weak acid exchanger which contains sulfates is passed through the anion exchange resin where regeneration and desorption of acid takes place. A continuous recirculation is set up which is continued until regeneration has occurred.

---

This invention relates to an improved process for demineralizing water or other polar liquids with ion exchange resins. In particular, the invention is directed to a liquid demineralization or purification process utilizing a multi-bed ion exchange system, one bed being a weak acid cation exchange resin, a second bed being a cation exchange resin in the hydrogen form, and a third being an anion exchange resin in the polyvalent salt form.

Under present practice, the most common method for demineralizing water with ion exchange resins involves the employment of a cation exchange resin in the hydrogen form and an anion exchange resin in the hydroxide form. The hydrogen ions of the cation resin are exchanged with the metal cations in the raw water, primarily sodium, magnesium and calcium, while the anions in the raw water are exchanged for the exchangeable hydroxide group of the anion exchange resin. The ultimate result of this dual resin treatment is the replacement of the cations and anions in the water by $H^+$ and $OH^-$.

An improved process is disclosed in copending application Ser. No. 262,244 which was filed on Mar. 1, 1963, now Patent No. 3,317,424, the disclosure of which is incorporated herein by reference. In this process, an anion exchange resin in the sulfate form is substituted for the anion exchange resins in the hydroxide form of the prior art. The resultant ion exchange system has several distinct advantages over the prior art hydrogen-hydroxide system all of which are fully explained in the aforementioned copending application. In general, the hydrogen-cation, sulfate-anion exchange resin system disclosed in the copending application has an advantage in that only one regenerant need be used to regenerate the exhausted resins to the hydrogen and sulfate forms. This regenerant may be spent or fresh aqueous sulfuric acid, the cation of which regenerates the cation resin to the hydrogen form and the anion of which regenerates the anion resin to the bisulfate form. The bisulfate form can then be converted to the sulfate form by rinsing with raw water of low solids or with demineralized water.

In U.S. Patent No. 3,359,199 an improved hydrogen form-sulfate form ion exchange resin system is described. In this copending application a three-bed system is disclosed which includes a weak acid cation exchange resin, a strong acid cation exchange resin, and an anion exchange resin in the sulfate form. It was found that a three-bed resin of this type provides a highly efficient and advantageous means for removing ions from brackish waters, and the like, of high alkalinity. The regeneration of the cation exchangers is carried out by passing $H_2SO_4$ first through the strong acid exchanger and then through the weak acid exchanger. It was found that a high percentage of acid utilization could be obtained by passing the excess $H_2SO_4$ from the strong acid exchanger to the weak acid exchanger. The anion exchanger in the copending application is regenerated either by the use of raw water of a high sulfate content or by passing the effluent leaving the weak acid cation exchange resin through the anion exchanger.

While the systems disclosed in the above identified copending applications have substantial advantages over the known prior art methods, these methods still require the use of substantial amounts of rinse water. The quantity of water used is of substantial importance where the system is employed on a large scale. Very often, a plant will produce as much as three million gallons of water per day. A system which will regenerate anion beds using but a few thousand gallons of water would be of great value as compared with an ordinary regeneration system producing a million or more gallons of waste water.

It is an object of the present invention to provide an improved process for demineralizing polar liquids utilizing a weak acid cation exchange resin, a strong acid cation exchange resin, and an anion exchange resin in the polyvalent salt form.

Another object of the invention is to provide an improved process for regenerating an exhausted anion exchange resin in the bisulfate form.

A more specific object is to provide an improved ion exchange system for brackish waters, and the like, which can be operated in a highly efficient and economical manner.

Still a further object is to provide an ion exchange system which does not require the use of large amounts of water to regenerate the anion exchange beds.

Other objects will become apparent to those skilled in the art from the following detailed description of the invention.

In general, the invention involves the discovery that an improved multi-bed ion exchange system results where the acid effluent from an exhausted sulfate-bisulfate or phosphate-dihydrogen phosphate anion exchange resin is passed through an exhausted weak acid cation exchange resin and where the effluent from the weak acid exchanger is passed through the exhausted anion resin in a complete cycle until regeneration of the anion resin is accomplished. In this system both beds can be regenerated with volumes of water limited to the water in the columns. This system affords complete weak acid exchange resin and sulfate anion resin regeneration. Where the raw water alkalinity of the brackish water is 50% or greater of total anions, the weak acid resin exchanger will not be completely regenerated by the acid effluent of the exhausted anion bed. In such cases the excess acid from the regenerated strong acid cation exchanger can be used as a supplement. At less than 50% alkalinity an excess of acid over the theoretical amount required to regenerate the weak acid exchanger is produced in the anion sulfate spent rinse. Under these circumstances an auxiliary weak acid cation exchange resin can be employed in the system or the capacity of the weak acid bed can be increased. Where a bed of this type is used it will not be fully exhausted during the cycle. An alkali wash can be used to place the bed in a fully exhausted condition. The subject process has as an added advantage the reduction of acid waste water produced by the R—HSO$_4$ anion bed during brackish water rinse regeneration.

The ion exchange systems of the invention, like other ion exchange systems known in the art, are equilibrium systems both in the ion exchange or resin exhaustion phase of the process and in the regeneration phase of the process. In the process, ion exchange resins are brought into contact with water or other polar liquid to be demineralized or deionized. The resin particles or beads may be slurried with the water or other polar liquid to be treated, although the more common procedure is to employ the resins in the form of beds through which the water or other polar liquid is passed and thereby brought into contact with the ion exchange resins.

The most predominant cations in raw waters, i.e., river water, lake water, well water, and the like, are sodium, calcium, and magnesium. In some instances, potassium and iron ions are also present in substantial amounts. The most commonly encountered anions in raw water are chloride, sulfate, bicarbonate and nitrate. These anions and cations, as well as any other anions or cations present in raw waters, can be effectively removed by hydrogen form and sulfate form ion exchange resins having salt splitting properties.

From a regeneration or conversion standpoint, the HSO$_4^-$ → SO$_4^{--}$ reaction is independent of the anion resin used. For this reason both strong base anion exchange resins and weak base anion exchange resins are contemplated within the scope of this invention.

Briefly, the anion exchange resins used in the practice of the invention are strongly or weakly basic anion exchange resins, i.e., anion exchange resins which in the hydroxide form are capable of converting inorganic salts in aqueous solution directly to hydroxides. Thus, a strongly basic anion exchange resin is capable of converting an aqueous solution of sodium chloride directly to an aqueous solution of sodium hydroxide. A strongly basic anion exchange resin can also be defined as one which on titration with hydrochloric acid in water free from electrolytes has a pH above 7.0 when the amount of hydrochloric acid added is one-half of that required to reach the inflection point (equivalence point). A weakly basic anion exchange resin under the same conditions has a pH below 7.0 when one-half of the acid required to reach the equivalence point has been added. The commercially available product Dowex 3 is an example of a polyamine-type weak base resin. Such resins usually contain a mixture of primary, secondary, and tertiary amine groups. The strongly basic anion exchange resins which are available commercially are characterized by the fact that the exchangeable anion is a part of a quaternary ammonium group. The quaternary ammonium group has the general structure:

wherein R$_1$, R$_2$ and R$_3$ represent alkyl or substituted alkyl groups, and X$^-$ is a monovalent anion.

Examples of the strongly basic anion exchange resins which can be employed in the practice of the invention are those resins disclosed in U.S. Patents 2,591,573, 2,597,440, 2,597,494, 2,614,099, 2,630,427, 2,632,000 and 2,632,001.

The strongly basic insoluble anion exchange resins which are preferably employed for the purpose of the invention are reaction products of a tertiary alkyl amine and a vinyl aromatic resin having halo methyl groups attached to aromatic nuclei in the resin and subsequently converted to the sulfate. Another class of strongly basic anion exchange resins suitable for the practice of the invention are the reaction products of tertiary carbocyclic or heterocyclic amines and vinyl aromatic resins having halo methyl groups attached to aromatic nuclei in the resin and subsequently converted to the sulfate.

The vinyl aromatic resins employed as starting materials in making the anion exchange resins employed in the preferred practice of the invention are the normally solid benzene-insoluble copolymers of a monovinyl aromatic compound and a polyvinyl aromatic compound containing from 0.5 to 40% by weight, preferably from 0.5 to 20% by weight of the polyvinyl aromatic compound, chemically combined with 99.5% to 60% by weight of the monovinyl aromatic compound. Examples of suitable monovinyl aromatic compounds are styrene, alpha methyl styrene, chlorostyrene, vinyl toluene, vinyl naphthalene, and homologues thereof, capable of polymerizing as disclosed, for example, in U.S. Patent 2,614,099. Examples of suitable polyvinyl aromatic compounds are divinyl benzene, divinyl toluene, divinyl xylene, divinyl naphthalene and divinyl ethyl benzene. These resins are halo methylated as described, for instance, in U.S. Patent 2,614,099, preferably to introduce an average of 0.2 to 1.5 halo methyl groups per aromatic nucleus in the copolymer and then reacted with a tertiary amine to introduce a quaternary ammonium anion exchange group. Examples of suitable tertiary amines are trimethyl amine, triethyl amine, tributyl amine, dimethyl propanol amine, dimethyl ethanol amine, methyl diethanolamine, 1-methyl-amino-2,3-propane diol, dioctyl ethanolamine, and homologues thereof.

The anion exchange resins can also be prepared by halogenating the molecule of the resin and then introducing an anion exchange group as described in U.S. Patent 2,632,000, and subsequently converting them to the sulfate, with or without admixture with the hydroxide form of the resin.

The preferred anion exchange resins used as starting materials in practicing the invention are Dowex SAR and Dowex SBR. The Dowex SBR is a styrene-divinylbenzene resin containing quaternary amine ion exchange groups in which the three R groups are methyl groups. This resin consists of spherical particles of 20 to 50 mesh and containing about 40% water. The divinylbenzene content is approximately 7.5%. The total exchange capacity is approximately 1.2 equivalents per liter, wet volume. The Dowex SAR is similar to the Dowex SBR except that one of the methyl groups in the quaternary amine salt structure is replaced by a hydroxy ethyl group. The Dowex SBR is somewhat more basic than the Dowex SAR.

As was pointed out in copending application Ser. No. 262,244, now U.S. Patent 3,317,424 the equilibrium ion exchange system there described can be used effectively with respect to water demineralization. In this case the anion exchange resin in the polyvalent salt form is used in conjunction with a cation exchange resin in the hydrogen form. The cation exchange resin provides exchangeable hydrogen ions. Resins of this nature are known in the prior art, one of the most common types thereof being a sulfonated resin. Dowex HCR–W is a sulfonated styrene divinyl benzene strongly acid cation exchanger of the type described in U.S. Patent 2,366,007.

Another suitable type of hydrogen form cation exchange resin is a sulfonic acid phenol-formaldehyde resin such as a resin derived by condensing a phenol sulfonic acid with formaldehyde. In general, resins having a plurality of sulfonic acid groups are the most suitable cation exchange resins for purposes of this invention.

The weak acid resins that are used in the present process comprise the present commercially available weakly acidic type resins containing carboxylic groups as the functional sites. These acids are analogous to weakly basic resins in most respects. The weak acid resins are operable at a pH above 7 and do not split neutral salts. One available product is identified by the trademark Zerolit 216. According to an article by A. Hinsley, Proc. 23d An. Water Conf. Engr. Soc. of Western Pennsylvania, October 1962, Zerolit 216 is a condensation product containing both phenolic and carboxylic groups This resin can remove sodium carbonate from water and its capacity for sodium is nearly equal to its capacity for calcium and magnesium. Zerolit 216 was used in the tests set out in the subject specification. It should be kept in mind, however, that other weak acid ion exchange resins can be used in the subject process.

Briefly, the equilibrium ion exchange systems of the invention are exemplified by the following equations for demineralization of water or other polar liquid containing, by way of example, sodium, calcium and magnesium cations and chloride, sulfate, bicarbonate and nitrate anions. R represents the resins. The longer arrow indicates the predominant reaction in the equilibrium systems.

DEMINERALIZATION EQUATIONS

Cations

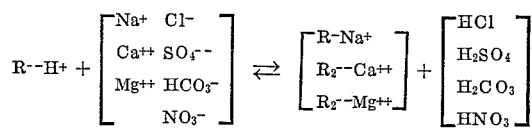

The carbonic acid may decompose in total or in part into water and carbon dioxide gas after it is formed.

Anion

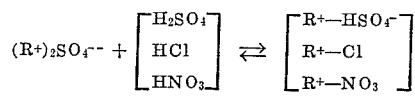

The reaction at an exchange site of the sulfate form anion exchange resin is fostered by the acidity of the aqueous media to convert one exchange site occupied by sulfate ion to bisulfate and sorb an anion in the aqueous phase on the other site. This may be illustrated, as follows, where $H^+X^-$ is the acid in the aqueous phase and $X^-$ is its anion.

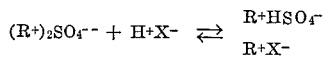

In demineralization of water, $X^-$ is predominantly one or more of $Cl^-$, $HSO_4^-$, $NO_3^-$, and $HCO_3^-$.

When strong acids such as hydrochloric acid, sulfuric acid, and nitric acid, produced as the effluent from the cation exchange resin, are passed downwardly for example, through a bed of such anion exchange resin, the top portion of the bed will be predominantly in the nitrate form, the mid-portion will be predominantly in the chloride form, and the lower portion of the bed will be predominantly in the bisulfate form.

As was pointed out above, in the subject process the weak acid cation exchanger removes metals associated with alkalinity such as carbonate and bicarbonate. The hydrogen or the carboxyl group is neutralized forming carbon dioxide. When the exhausted weak acid exchanger is regenerated with waste $H_2SO_4$, $H^+$ goes on the carboxyl group driving off the $Ca^{++}$ or $Mg^{++}$ ions. The $Ca^{++}$ or $Mg^{++}$ ions attached to $SO_4^{--}$ to form calcium sulfate or magnesium sulfate which leaves with the effluent.

It has been found that both weak acid cation exchanger and the anion exchanger can be regenerated simply by recirculating the amount of water contained in the column voids. When the alkalinity in the raw water is equal to approximately 50% TDS (total dissolved solids) the anion column can be regenerated by the recirculation of the effluent from the weakly acidic cation exchanger and the weakly acidic cation exchanger can be regenerated by the sulfuric acid which is in the effluent leaving the anion exchanger. Where the alkalinity in the raw water is greater than 50% TDS, the weak acid resin will not be completely regenerated by the acid effluent of the exhausted anion bed. In this case, however, the excess acid from the regeneration of the strong acid cation exchanger can be used to supplement the action of the acid from the anion exchanger. The use of excess acid from the strong acid exchanger for this purpose is described in copending application Ser. No. 421,418, filed on Dec. 28, 1964, now U.S. Patent 3,359,199.

Where the alkalinity of the raw water is less than 50%, an excess of acid over the theoretical amount required to regenerate the weak acid exchanger is present in the effluent from the exhausted anion exchanger. In this case one of at least two modifications can be made in the process. In a first modification, a weak acid exchanger is used having excess capacity. The excess acid is then used up in regenerating the oversized weak acid exchanger. By oversized we mean a resin bed having a greater capacity than that required for a given cycle. Inasmuch as the weak acid exchanger is not fully exhausted during the cycle, an alkali solution or slurry can be passed through the weak acid exchanger in order to produce total exhaustion of the bed. A highly desirable alkali for this purpose would be a lime slurry of the type described in copending application Ser. No. 431,178, filed on Feb. 8, 1965, now Patent No. 3,391,078.

In a second modification of the basic process where the alkalinity of the raw water is less than 50%, a second weak acid cation exchanger can be added to the system. This second bed takes up the excess acid from the anion exchanger. In this case the effluent from the anion exchanger will pass through the first weak acid cation exchanger and then through the second weak acid cation exchanger and the effluent from the second weak acid cation exchanger would be recirculated to the anion exchanger.

As was indicated above, the effluent from the weak acid exchanger is recirculated to the anion exchanger. The effluent contains sulfates such as calcium sulfate and magnesium sulfate. In regenerating the anion exchange resin from the bisulfate form to the sulfate form, at least three mechanisms can take place. The primary mechanism is one of dilution with water of the bisulfate resin to the sulfate resin. The mechanism can be illustrated by the following equation:

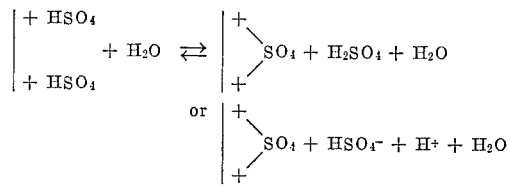

The sulfate ions contained in the effluent from the weak acid exchanger may also push out the bisulfate in accordance with the following equation:

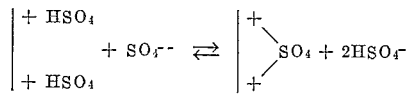

Where the raw water is high in chlorides the sulfate contained in the effluent from the weak acid exchanger will also displace the chloride ions in accordance with the following equation:

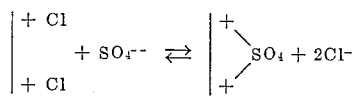

In order to efficiently elute chlorides with sulfates according to the above mechanism, it is necessary to keep the sulfate concentration below 1.23% $Na_2SO_4$ or equivalent. Inasmuch as the sulfate is limited by the solubility of $CaSO_4$, it is less than 2,000 p.p.m., the 1.23% $Na_2SO_4$ limit will not be exceeded in the subject process.

The following blocks and loadings illustrate the application of a weakly acidic cation exchange resin in demineralizing brackish water.

The capacities of the various beds depend upon the water analysis. Enough resin is used so that the various beds exhaust at the same time. Where an auxiliary weakly acidic cation bed is used only enough resin is employed to take care of the excess acid contained in the effluent from the anion bed. The following is an illustration of the application of the present system in demineralizing brackish water.

| TDS of raw water 100 GPG as CaCO₃ Cycle volume 1000 gals/cycle | Weakly Acidic Cation A' | Weakly Acidic Cation A | Strongly Acidic Cation B | Anion Bed C |
|---|---|---|---|---|
| | Loadings on units A, B & C per cycle KGR as CaCO₃ | | | |
| Raw water alk. | A | B | | C |
| (50-X)% | 50-X | 50+X | | 50+X |
| 50% | 50 | 50 | | 50 |
| (50+X)% | 50+X | 50-X | | 50-X |

The loading on the weakly acidic resin is equivalent to the raw water alkalinity. When the loading on A is equal to the loading on Bed C, the weakly acidic resin and the anion resin may be regenerated by direct recirculation, i.e., recirculation of A and C only. When the alkalinity of the raw water is greater than 50% an insufficient amount of acid will be eluted from Bed C to fully regenerate Bed A. In this case, excess acid produced by the regeneration of Bed B can be used as a supplement in the regeneration of Bed A. When the alkalinity of the raw water is less than 50% TDS an excess of acid will be present in the effluent from Bed C. In this case, the effluent from Bed C would pass through Bed A and then through Bed A'. Bed A' is an auxiliary weakly acidic cation resin. The effluent from Bed A' will be recirculated to the anion Bed C. As was pointed out above, in an alternative embodiment, Bed A' can be eliminated by increasing the capacity of Bed A where the alkalinity of the water is less than 50% TDS.

Instead of using an anion resin in the sulfate-bisulfate forms, the invention can be practiced also with the strongly basic anion exchange resin in the orthophosphate, hydrogen phosphate, and dihydrogen phosphate forms. The phosphate form has an advantage over the sulfate form in that the phosphate anion has three dissociation stages instead of two, whereby a lesser mol equivalent of $PO_4^{---}$ is required to occupy the resin exchange sites than is the case with $SO_4^{--}$. On the other hand, however, phosphoric acid and phosphates are ordinarily considerably more expensive than sulfuric acid and sulfates, respectively, whereby the sulfate-bisulfate system in most circumstances will be the more economical to operate. In cases where this situation does not exist, the phosphate-type anion exchange system can be employed to advantage in the same manner as the sulfate-type anion exchange system.

In addition to water other polar solvents such as methanol, ethyl ether, tetrahydrofurane, etc., can be demineralized by the subject process.

The disclosure of copending applications Ser. No. 262,244, filed Mar. 1, 1963, now Patent No. 3,317,424; Ser. No. 421,418, filed Dec. 28, 1964, now Patent No. 3,359,199; and Ser. No. 431,178, filed Feb. 8, 1965, now Patent No. 3,391,078, are incorporated herein by reference.

Obviously many modifications and variations of the invention as hereinbefore set forth may be made without departing from the spirit and scope thereof, and therefore only such limitations should be imposed as are indicated in the appended claims.

We claim:

1. A process for regenerating an exhausted multibed ion exchange system including a weak acid cation exchange resin bed, a strong acid cation exchange resin bed, and an anion exchange resin bed in the polyvalent salt form, which comprises: passing water contained in the voids of the exhausted anion exchange resin bed through said exhausted anion exchange bed, circulating the thusly produced effluent from the exhausted anion exchange bed through the exhausted weak acid cation exchange bed and continuously circulating the thusly produced effluent from the weak acid cation exchange bed through the anion exchange bed until said beds have been regenerated, and flowing dilute acid through the exhausted strong acid cation exchange resin bed to regenerate said strong acid cation exchange resin.

2. A process for regenerating an exhausted multi-bed ion exchange system including a weak acid cation exchange resin bed, a strong acid cation exchange resin bed, and an anion exchange resin bed in the bisulfate form, which comprises: passing water contained in the voids of the exhausted anion exchange resin bed through said exhausted anion exchange resin bed, circulating the thusly produced effluent from the exhausted anion exchange bed through the exhausted weak acid cation exchange bed and continuously circulating the thusly produced effluent from the weak acid cation exchange bed through the anion exchange bed until said beds have been regenerated, and flowing dilute acid through the exhausted strong acid cation exchange resin bed to regenerate said strong acid cation exchange resin.

3. A process for treating water having an alkalinity of about 50% TDS as $CaCO_3$ which comprises: passing said water through a weak acid cation exchange resin bed, through a strong acid cation exchange resin bed, and then through an anion exchange resin bed in the polyvalent salt form until said beds are exhausted; passing water contained in the voids of the exhausted anion exchange resin bed through said exhausted anion exchange resin bed, and thereafter passing the thusly produced effluent from the exhausted anion exchange bed through the weak acid cation exchange bed and passing the thusly produced effluent from the weak acid cation exchange bed through the exhausted anion exchange bed until said beds have been regenerated; and passing dilute sulfuric acid through said exhausted strong acid cation exchange resin bed to regenerate said strong acid cation exchange resin.

4. A process as in claim 3 wherein the anion exchange resin is a strong base anion exchange resin in the sulfate form.

5. A process for treating water having an alkalinity of greater than 50% TDS as $CaCO_3$ which comprises: passing said water through a weak acid cation exchange resin bed, through a strong acid cation exchange resin bed, and then through an anion exchange resin bed in the polyvalent salt form until said beds are exhausted; passing water contained in the voids of the exhausted anion exchange resin bed through said exhausted anion exchange resin bed, passing the thusly produced effluent from the exhausted anion exchange resin bed through the weak acid cation exchange resin bed and passing the thusly produced effluent from the weak acid cation exchange resin bed through the anion exchange resin bed in a continuous cycle until said anion exchange resin bed has been regenerated; passing dilute sulfuric acid through the exhausted strong acid cation exchange resin bed to regenerate said strong acid cation exchange resin bed, and passing the excess acid from the regeneration of the strong acid cation exchange resin bed through the weak acid cation exchange resin bed whereby said weak acid cation exchange resin bed is regenerated.

6. A process as in claim 4 wherein the anion exchange resin is a strong base anion exchange resin in the sulfate form.

7. A process for treating water having an alkalinity of less than 50% TDS as $CaCO_3$ which comprises: passing said water through a weak acid cation exchange resin bed having excess capacity, through a strong acid cation exchange resin bed, and through an anion exchange resin bed in the polyvalent salt form until said strong acid cation exchange resin bed and said anion exchange resin bed have become exhausted; thereafter exhausting the weak acid cation exchange resin bed by passing an aqueous alkaline dispersion through said weak acid cation exchange resin bed; and thereafter regenerating said anion exchange resin bed and said weak acid cation exchange resin bed by passing water contained in the voids of the exhausted anion exchange resin bed through said exhausted anion exchange resin bed and circulating the thusly produced effluent from the anion exchange resin bed through the weak acid cation exchange resin bed and passing the thusly produced effluent from the weak acid cation exchange resin bed through the anion exchange resin bed in a continuous cycle until said resin beds have been regenerated; and passing dilute sulfuric acid through the strong acid cation exchange resin bed to regenerate said strong acid cation exchange resin bed.

8. A process as in claim 5 wherein the anion exchange resin is a strong base anion exchange resin in the sulfate form.

9. A process for treating water having an alkalinity of less than 50% TDS as $CaCO_3$ which comprises: passing said water through a weak acid cation exchange resin bed, through a strong acid cation exchange resin bed, and through an anion exchange resin bed in the polyvalent salt form until said resin beds have become exhausted; regenerating the resins by passing water contained in the voids of the exhausted anion exchange resin bed through said exhausted anion exchange resin bed and passing the thusly produced effluent from the exhausted anion exchange resin bed through the exhausted weak acid cation exchange resin bed and then through a second bed of exhausted weak acid cation exchange resin and passing the thusly produced effluent from the second weak acid cation exchange resin bed through the anion exchange resin bed in a continuous cycle until said resin beds have been regenerated; and passing dilute sulfuric acid through the strong acid cation exchange resin bed until said strong acid cation exchange resin bed has been regenerated.

10. A process as in claim 6 wherein the anion exchange resin is a strong base anion exchange resin in the sulfate form.

References Cited

UNITED STATES PATENTS

| | | | |
|---|---|---|---|
| 2,772,237 | 11/1956 | Bauman et al. | 210—32 X |
| 3,156,644 | 11/1964 | Kunin | 210—37 X |
| 3,186,940 | 6/1965 | Vajna | 210—38 X |
| 3,359,199 | 12/1967 | Schmidt | 210—37 X |

FOREIGN PATENTS 1,274,871   9/1961   France.

OTHER REFERENCES

Anderson et al.: Industrial and Engineering Chemistry, vol. 47, Issue 8, pp. 1620–1623, August 1955.

SAMIH N. ZAHARNA, *Primary Examiner.*

C. M. DITLOW, *Assistant Examiner.*

U.S. Cl. X.R.

210—34, 37, 38